Figure 1:
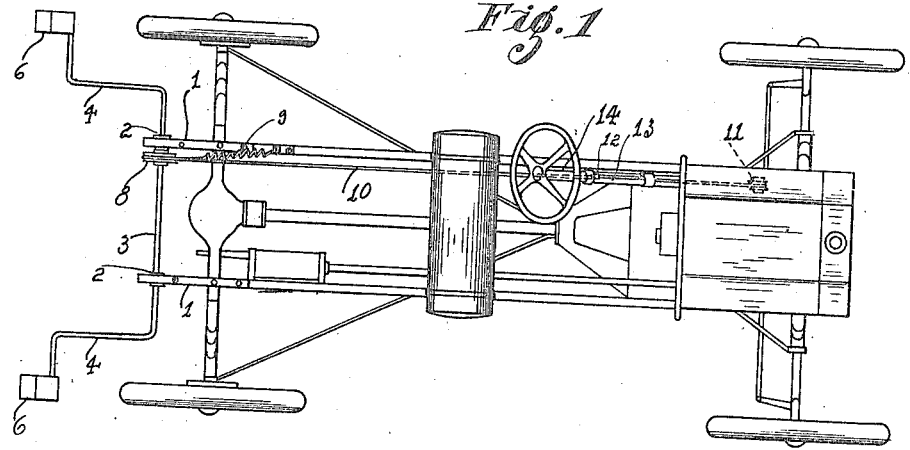

F. D. GRANDBOIS.
BRAKE FOR MOTOR VEHICLES.
APPLICATION FILED JAN. 17, 1916.

1,190,542.

Patented July 11, 1916.

WITNESS.

Floyd M. Blanchard

INVENTOR.
Francois D. Grandbois
BY
ATTORNEY

UNITED STATES PATENT OFFICE.

FRANCOIS D. GRANDBOIS, OF STOCKTON, CALIFORNIA.

BRAKE FOR MOTOR-VEHICLES.

1,190,542.　　　Specification of Letters Patent.　　Patented July 11, 1916.

Application filed January 17, 1916. Serial No. 72,466.

*To all whom it may concern:*

Be it known that I, FRANCOIS D. GRANDBOIS, a citizen of the United States, residing at Stockton, in the county of San Joaquin, State of California, have invented certain new and useful Improvements in Brakes for Motor-Vehicles; and I do declare the following to be a full, clear, and exact description of the same, reference being had to the accompanying drawings, and to the characters of reference marked thereon, which form a part of this application.

This invention relates to improvements in vehicle brakes and particularly to an auxiliary rear brake adapted for use on vehicles to prevent the same from backing when on inclined places, such as in hilly country and the like, the object of the invention being to produce such auxiliary rear brakes so arranged (especially on motor cars), that in the event the engine should stall or the vehicle should otherwise come to a stop on a slope and start to back without control, such auxiliary brakes could be dropped into place behind the rear wheels to prevent further movement of the vehicle.

It is a well known fact that many accidents have occurred by reason of engines of motor vehicles stalling on grades and the vehicles backing off the grade before they could be brought under control, and it is such catastrophes as these that I aim to overcome by the use of my improved invention.

A further object of the invention is to produce a simple and inexpensive device and yet one which will be exceedingly effective for the purposes for which it is designed.

These objects, I accomplish by means of such structure and relative arrangement of parts as will fully appear by a perusal of the following specification and claim.

In the drawings similar characters of reference indicate corresponding parts in the several views.

Figure 2:
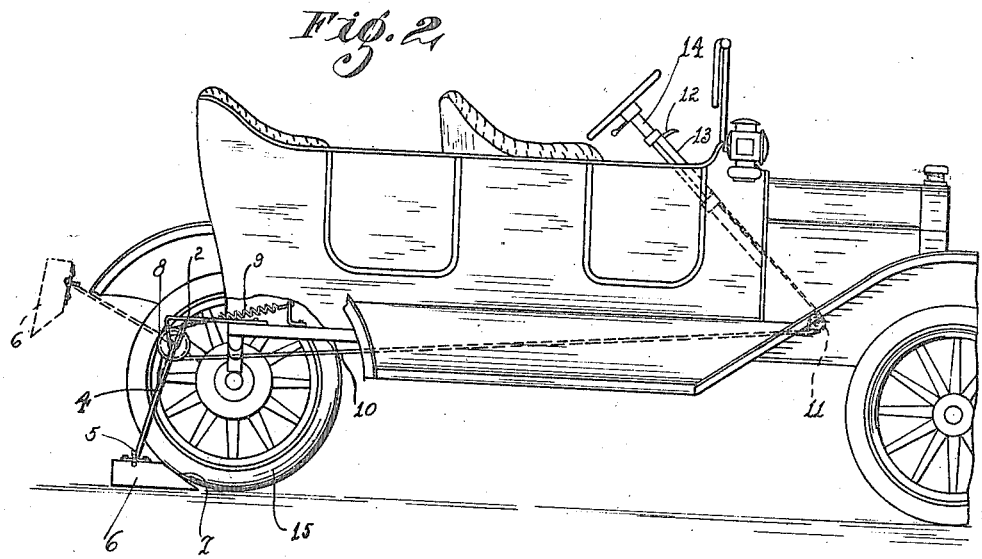

Figure 1 is a top plan view of the chassis of a motor vehicle showing my improved brake mechanism installed therein. Fig. 2 is a side elevation of a motor vehicle partly broken out and showing the same mechanism.

Referring now more particularly to the characters of reference on the drawings, I first provide a pair of projecting brackets 1 secured to the rear end of the motor vehicle in any suitable manner. In the outer ends of the brackets 1 are bearings 2, turnable in which is a rod 3, such rod 3 having a pair of L-shaped projecting arms 4. Secured on the outer end of each of the L-shaped arms 4 by means of set screws 5 are spring blocks 6 having beveled front edges 7. Secured on the rod 3 is a pulley 8.

The numeral 9 designates a spring fixed at one end to the pulley 8 and at the other end to some point on the vehicle.

The numeral 10 designates a cable connected to the pulley 8 in a reverse position to the spring 9 and extending over the pulley 11 and being thus connected with the hook 12 movable in the guide 13 secured to the supporting post 14 of the vehicle.

The spring 9 normally acts on the pulley 8 to turn the shaft 3 so as to hold the arms 4 in such position as to keep the blocks 6 elevated from the ground. When, however, it is desired to use the brake 6 in such emergencies as are noted in the preamble to this specification, the operator grasps the hook 12 and pulls on the cable 10, which action rotates the pulley 8 and extends the spring 9. The rotation of the pulley 8 rotates the shaft 3 and moves the brake blocks 6 into position behind the rear wheels 15 of the vehicle. When the need of the brakes is passed, the operator releases the hook 12 and the spring 9 again elevates the brake blocks from the ground.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A brake mechanism comprising a shaft turnably mounted on the rear end of the vehicle, projecting arms on the brake, brake blocks on the arms, a pulley on the shaft, a spring connected with the pulley and with the vehicle, and a cable connected with the pulley and extending to a point adjacent the driving seat of the vehicle, as described.

In testimony whereof I affix my signature

FRANCOIS D. GRANDBOIS.